US011745393B2

(12) United States Patent
Miyasaka

(10) Patent No.: US 11,745,393 B2
(45) Date of Patent: Sep. 5, 2023

(54) METHOD OF USING MOLD SUBJECTED TO SURFACE TREATMENT OF MOLDING SURFACE OF SAID MOLD

(71) Applicant: FUJI KIHAN CO., LTD., Nagoya Aichi (JP)

(72) Inventor: Yoshio Miyasaka, Nagoya Aichi (JP)

(73) Assignee: FUJI KIHAN CO., LTD., Nagoya (JP)

(*) Notice: Subject to any disclaimer, the term of this patent is extended or adjusted under 35 U.S.C. 154(b) by 43 days.

(21) Appl. No.: 17/058,829

(22) PCT Filed: Nov. 27, 2018

(86) PCT No.: PCT/JP2018/043619
§ 371 (c)(1),
(2) Date: Nov. 25, 2020

(87) PCT Pub. No.: WO2019/234951
PCT Pub. Date: Dec. 12, 2019

(65) Prior Publication Data
US 2021/0138692 A1 May 13, 2021

(30) Foreign Application Priority Data
Jun. 7, 2018 (JP) ................................ 2018-109518

(51) Int. Cl.
*B29C 33/42* (2006.01)
*B29C 33/38* (2006.01)
(Continued)

(52) U.S. Cl.
CPC .............. *B29C 33/42* (2013.01); *A23P 30/10* (2016.08); *B29C 33/3842* (2013.01);
(Continued)

(58) Field of Classification Search
CPC ...... B29C 33/42; B29C 33/3842; B29C 33/56; C21D 7/06; C21D 24/04
See application file for complete search history.

(56) References Cited

U.S. PATENT DOCUMENTS 6,455,465 B1    9/2002  Miyasaka
9,364,894 B2*   6/2016  Hirano .................... B22C 9/061
(Continued)

FOREIGN PATENT DOCUMENTS

EP    0980709 A1    2/2000
EP    3054027 A1    8/2016
(Continued)

OTHER PUBLICATIONS

Corresponding International Application No. PCT/JP2018/043619 International Search Report dated Feb. 26, 2019, 5 pages.
(Continued)

*Primary Examiner* — Jerzi H Moreno Hernandez
(74) *Attorney, Agent, or Firm* — Ronald M. Kachmarik; Cooper Legal Group LLC

(57) ABSTRACT

Surface material of a mold molding surface and surface treatment method. A molding surface of material including metal and in which the molding surface reaches 50° C. or higher during molding is subjected to rapid thermal processing by injecting a substantially spherical shot with a hardness equal to or greater than the surface hardness of the mold and a size of #220 (JIS R6001-1973) or smaller at an injection pressure of 0.2 MPa or more and bombarding the surface with the shot, causing the temperature to rise locally and instantaneously at a bombarded portion to refine the surface structure of the surface and to form numerous smooth arc-shaped indentations on the entire surface of the surface. Then, powder including titanium having size of #100 or smaller is injected at an injection pressure of 0.2
(Continued)

EXAMPLE

MPa or more to form a coating of titanium oxide on the surface of the surface.

7 Claims, 1 Drawing Sheet

(51) Int. Cl.
   *B29C 33/56* (2006.01)
   *C21D 7/06* (2006.01)
   *C23C 24/04* (2006.01)
   *A23P 30/10* (2016.01)
(52) U.S. Cl.
   CPC ............... *B29C 33/56* (2013.01); *C21D 7/06* (2013.01); *C23C 24/04* (2013.01); *B29K 2905/00* (2013.01)

(56) References Cited

U.S. PATENT DOCUMENTS

| | | | | |
|---|---|---|---|---|
| 2002/0055005 A1* | 5/2002 | Miyasaka | ............... | B01J 35/004 |
| | | | | 428/472 |
| 2012/0144890 A1* | 6/2012 | Miyasaka | ................ | C21D 7/06 |
| | | | | 72/53 |
| 2015/0021826 A1* | 1/2015 | Taboryski | ......... | C23C 16/45525 |
| | | | | 425/542 |
| 2016/0221036 A1 | 8/2016 | Miyasaka | | |
| 2018/0222089 A1* | 8/2018 | Mase | .................... | B29C 33/424 |
| 2019/0022824 A1 | 1/2019 | Miyasaka | | |
| 2021/0269922 A1* | 9/2021 | Miyasaka | ............... | C23C 24/04 |
| 2022/0347893 A1* | 11/2022 | Miyasaka | ............... | A23P 30/10 |

FOREIGN PATENT DOCUMENTS

| | | | | | |
|---|---|---|---|---|---|
| JP | H0929919 A | | 2/1997 | | |
| JP | 11-270005 A | | 10/1999 | | |
| JP | 2000061314 A | | 2/2000 | | |
| JP | 2005002457 A | * | 1/2005 | ............ | C23C 24/04 |
| JP | 2008-307735 A | | 12/2008 | | |
| JP | 3150048 U | * | 4/2009 | | |
| JP | 3150048 U | | 4/2009 | | |
| JP | 2015-513606 A | | 5/2015 | | |
| KR | 20160096015 A | | 8/2016 | | |
| WO | 2017026057 A1 | | 2/2017 | | |
| WO | 2017175463 A1 | | 10/2017 | | |

OTHER PUBLICATIONS

Corresponding Indian Application No. 202017052807, Indian Office action dated Jan. 3, 2022.

Corresponding European Application No. 18922033.8, European Office action dated Jan. 12, 2022.

* cited by examiner

UNTREATED

EXAMPLE

METHOD OF USING MOLD SUBJECTED TO SURFACE TREATMENT OF MOLDING SURFACE OF SAID MOLD

FIELD OF THE INVENTION

The present invention relates to a surface material of a molding surface of a mold (hereinafter, referred to simply as "molding surface") and to a method for surface treatment of a molding surface to obtain the surface material, and more specifically to a surface material of a molding surface of a mold and to a method for surface treatment of the molding surface having the objective of improving wear resistance, corrosion resistance, and demoldability.

BACKGROUND OF THE INVENTION

In order to extend the lifespan of a mold employed for molding a resin or the like, strengthening of the molding surface is performed to improve the wear resistance of the molding surface of the mold, which contacts the material being molded.

In particular, in a mold for molding a resin material, to which a filler made from a powder, fibers or the like of glass, ceramic, or metal etc. has been added at a high blending proportion of from 40% to 50% in order to improve the strength of a molded article, the molding surface is even more readily worn by contact with such a filler. This accordingly leads to even higher demands for strengthening in order to impart wear resistance or the like.

Moreover, the molding surface employed for molding resin is susceptible to corrosion from contact with a corrosive gas given off from resin heated to high temperature, and from corrosive substances and the like adhering thereto. The smoothness of a surface of the mold is lost when corrosion occurs, which in turn leads to the generation of defective molding accompanying reduced demoldability and the transfer of holes (pitting corrosion) arising due to corrosion, and to defective molding and the like generated by the incorporation of dirt that had been baked on to the surface of the mold into the article being molded.

This means that as well as demand for the wear resistance described above, there is also demand for high corrosion resistance for a molding surface of a mold, and in particular for a molding surface of a mold for molding a molding material such as a synthetic resin or rubber that generates corrosive gas or corrosive adhering substances.

In relation to corrosion resistance out of the above problems, molds are manufactured using high corrosion resistant stainless steels, however, it is not possible to completely prevent the occurrence of corrosion by using such high corrosion resistant stainless steels. Moreover, although an improvement in the corrosion resistance can be expected by using such a surface material for the molding surface and by the treatment method thereof, such an approach does not enable wear resistance to be improved by hardening at the same time.

In order to improve wear resistance by hardening, in cases in which an attempt is made to increase corrosion resistance at the same time, generally a hard substance is employed for the surface for molding of the mold and this is then coated with a coating film configured from a highly corrosion resistant material. An improvement in both wear resistance and corrosion resistance is achieved by performing various plating treatments on the surface of the molding surface, such as nickel plating, chromium plating, etc., or by performing ceramic coating or diamond-like carbon (DLC) coating using PVD or CVD.

Moreover, prior to performing such coating, various types of heat treatment and nitriding treatment are also employed in combination on the surface of a base material to achieve even greater hardening.

Note that although not entirely preventing corrosion of a mold, a surface treatment by shot peening is known as a method to prevent the occurrence of stress corrosion cracking which can occur with corrosion.

Namely, one cause of stress corrosion cracking occurring is the presence of tensile stress, and the generation of stress corrosion cracking is suppressed by performing shot peening on the surface of a mold to release the tensile stress and to also impart a compressive residual stress thereto.

Moreover, although not prescribed for surface treatment to a mold, in order to further improve the corrosion resistance of a corrosion resistant metal, the present applicant has already filed and received registration for a Japanese Utility Model Application for the following high corrosion resistant metal. In the registered Japanese Utility Model, a surface of a substrate of stainless steel or the like is subjected to the ejection of a powder having a hardness of not less than that of the substrate at an ejection velocity of not less than 50 m/s, or at an ejection pressure of not less than 0.29 MPa. The metal structure at the substrate surface is strengthened and hardened by forming a layer from fine crystals having a particle diameter of not more than 1 μm. The substrate surface formed with the fine crystal layer is then subjected to ejection of an ejection powder arising from mixing a titanium or titanium alloy powder with a precious metal powder at an ejection velocity of not less than 80 m/s, or at an ejection pressure of not less than 0.29 MPa. A titanium oxide coating film of supporting the precious metal and/or an oxide of a precious metal is thereby formed on the surface of the substrate, so as to produce the high corrosion resistant metal (see claim 1 and the like of Patent Document 1).

PRIOR ART DOCUMENTS

Patent Documents

Patent Document 1: Japanese Utility Model Registration No. 3150048

Problems to be Solved by the Invention

From out of a surface materials of a molding surface of a mold and a method for surface treatment to obtain such a surface material as described above, a method to coat the surface of a base material of metal mold with a coating using various types of plating and PVD or CVD can be used to raise the surface hardness by covering the surface of the base material with a hard coating film. Not only can the wear resistance be improved in this manner, but the corrosion resistance can also be improved by covering the surface of the base material and stopping contact with corrosion-causing oxygen and water, and corrosive gases and the like.

However, raising the corrosion resistance and the wear resistance by coating surfaces of molds increases the manufacturing cost of molds due to increasing the number of manufacturing processes in order to perform coating. In particular for DLC coating, there is a dramatic rise in cost, due to the expense thereof.

Moreover, forming a coating film changes the dimensions of a mold, and so a base material needs to be processed to dimensions that consider the coating film forming. There is also a need to tightly control coating thickness during film forming, and a need to perform processing and film forming at high precision.

Moreover, in cases in which wear resistance and corrosion resistance is imparted by forming a coating film, the effectiveness of both the wear resistance and corrosion resistance is lost when the coating film is damaged (such as by cracks, delamination, etc.).

Moreover, from out of the method for surface treatments described above, although shot peening is effective as a method to prevent stress corrosion cracking by imparting compressive residual stress to the surface of the mold, shot peening is not able to prevent corrosion itself, and so is not able to prevent the generation of corrosions such as grain boundary corrosion.

Note that the method for surface treatment introduced in Patent Document 1 attempts to harden the surface of the substrate by forming the fine crystal layer described above, and enables a titanium oxide coating film having a high strength of adhesion to be formed by forming a coating film of titanium oxide supporting a precious metal and/or an oxide of a precious metal above the fine crystal layer. Oxidation of the substrate is proactively prevented by reducing capabilities exhibited by this titanium oxide coating film having a photocatalytic action. As a result, not only is a high corrosion resistance obtained, but it is also possible to achieve both effects of an improvement in hardening and corrosion resistance at the same time using the comparatively simply treatment of ejecting a powder or granules.

However, the improvement in corrosion resistance through the method described in Patent Document 1 is an improvement in corrosion resistance achieved by utilizing the reducing capabilities exhibited by a photocatalytic action as determined by performing tests under irradiation of "sunlight (daytime)" (paragraph [0088] of Patent Document 1). Thus a loss of the corrosion resistance effect exhibited by the photocatalytic action would be expected in cases in which application is made to a metal article employed in a state in which light is blocked, as is the case for a molding surface of a mold.

An objective of the present invention is accordingly to use a comparatively simple method of ejecting a powder or the like, similar to that of the invention described in the Patent Document 1 listed above, to provide a surface material for a molding surface of a mold, and a method for surface treatment to obtain this surface material, with the surface material and method for surface treatment capable of hardening a surface of a mold and achieving an improvement in corrosion resistance, as well as also improving demoldability.

SUMMARY OF INVENTION

Means for Solving the Problem

In order to achieve the objective of the present invention, a surface material of a molding surface of a mold according to the present invention comprises:

a micronized surface structure on at least the molding surface of the mold made from a metal, or a substance including a metal, for which the molding surface reaches 50° C. or hotter during molding;

innumerable smooth circular arc shaped depressions lacking pointed protrusions formed on an entire surface of the molding surface; and a titanium oxide coating film formed on a surface of the molding surface.

Preferably, the metal is a metal susceptible to corrosion.

Preferably, the mold is a mold employed for molding a food product, a thermoplastic resin, a thermoset resin, a natural rubber, or a synthetic rubber.

Preferably, the mold is a mold employed for molding a resin in which the molding surface reaches from 100° C. to 400° C. during molding through contact with molten resin or the like or through heating the mold itself.

Furthermore, in order to achieve the objective of the present invention, a method for surface treatment of a molding surface according to the present invention comprises:

ejecting substantially spherical shot against at least the molding surface of the mold made from a metal or a substance including a metal for which the molding surface reaches 50° C. or hotter during molding, the substantially spherical shot having a size of 220 grit (JIS R6001-1973) or finer and having a hardness equivalent to or harder than a surface hardness of the mold, the substantially spherical shot ejection being at an ejection pressure of not less than 0.2 MPa so as to perform instantaneous heat treatment by impact of the substantially spherical shot causing a local and instantaneous rise in temperature at impacted portions, so as to micronize a surface structure of the molding surface and form innumerable smooth circular arc shaped depressions over an entire surface of the molding surface; and forming a titanium oxide coating film on the molding surface by ejecting a powder formed from titanium or titanium alloy having a size of 100 grit (JIS R6001-1973) or finer by ejecting at an ejection pressure of not less than 0.2 MPa against a surface of the mold that had been subjected to the instantaneous heat treatment so as to form a titanium oxide coating film on a surface of the molding surface.

It is preferable to perform a preliminary treatment process prior to performing the instantaneous heat treatment, the preliminary treatment process including ejecting a carbide powder having a size of 220 grit (JIS R6001-1973) or finer by ejecting at an ejection pressure of not greater than 0.2 MPa against at least the molding surface so as to cause carbon element contained in the carbide powder to diffuse into the surface of the mold.

Preferably, the carbide powder ejected in the preliminary treatment process is a silicon carbide (SiC) powder.

Effect of the Invention

In the present invention as described above, the surface material of a molding surface of a mold and the method for surface treatment to obtain this surface material enable not only the molding surface, which hitherto has been processed to a specular (mirror) finish by a method such as hand polishing or the like, to be imparted with improved molding surface hardness and wear resistance by treatment with blast processing that is a comparatively simple method, but also enable an improvement in antifouling effect and corrosion resistance to be achieved.

As a result, in the present invention, the surface material of a molding surface of a mold and a mold treated with the method to obtain this surface material both enable surface treatment of a mold to be performed comparatively more simply than cases in which, as described above, hand polishing is performed and then after hand polishing a coating film is formed by plating or by PVD or CVD. Molds can accordingly be manufactured with a shorter lead time and for a cheaper price. Moreover, the lifespan of a mold is extended by improving the wear resistance by hardening and by improving the corrosion resistance, thereby enabling the manufacturing cost of articles to be molded to be greatly reduced due to being able to reduce the defect rate when molding.

Note that in the present invention, the surface material of a molding surface of a mold and a mold on which surface treatment has been performed by the method to obtain this surface material, the advantageous effects of corrosion resistance and antifouling described above are thought to be effects produced by a titanium oxide coating film formed on the molding surface exhibiting a photocatalyst-like function. However, this result, i.e. a corrosion resistance and antifouling effect being exhibited by forming a titanium oxide coating film on a molding surface of a mold not irradiated with light during molding a molding material, is an unexpected effect.

Thus although the reasons are not fully understood as to why the advantageous effects of corrosion resistance and antifouling were obtained on a molding surface of a mold not irradiated with light during molding, it is thought that heating or warming of the molding surface during molding resulted in catalytic activation by the heat therefrom. The advantageous effects of improved corrosion resistance and antifouling and the like are thought to arise from a reducing action of the oxide, and from the decomposition of corrosive gases and adhering substances due to the degradative ability of organic materials, and from antifouling and the like due to hydrophilic properties being exhibited.

Thus an improvement in corrosion resistance and prevention of dirt adhering is achieved by applying in the present invention the surface material of a molding surface of a mold and a mold treated with the treatment method to obtain this surface material, to a mold with a molding surface that reaches 50° C. or hotter during molding, and in particular to a mold employed for molding resins in which the temperature of the molding surface during molding is, for example, from 100° C. to 400° C.

Moreover, in cases in which the surface material of a molding surface of a mold according to the present invention and the method for surface treatment are applied to a mold employed for molding a thermoplastic resin or rubber, in addition to improving the corrosion resistance by the reducing capabilities, an improvement in corrosion resistance is also obtained by decomposition of corrosive gases and adhering substances arising from the molding material in a heated state. Bad smells are also reduced by such decomposition, and so an improvement in the work environment can also be achieved.

Furthermore, in cases in which a preliminary treatment process is performed of ejecting a specific carbide powder, for example a silicon carbide (SiC) powder, against a molding surface of a mold prior to instantaneous heat treatment, carbon in the carbide powder diffusing and penetrating into (carburizing) the surface of the mold enables the hardness in the vicinity of the surface for molding to be raised even more, and enables a greater improvement in wear resistance and the like to be achieved.

EMBODIMENTS TO CARRY OUT THE INVENTION

Figure 1:
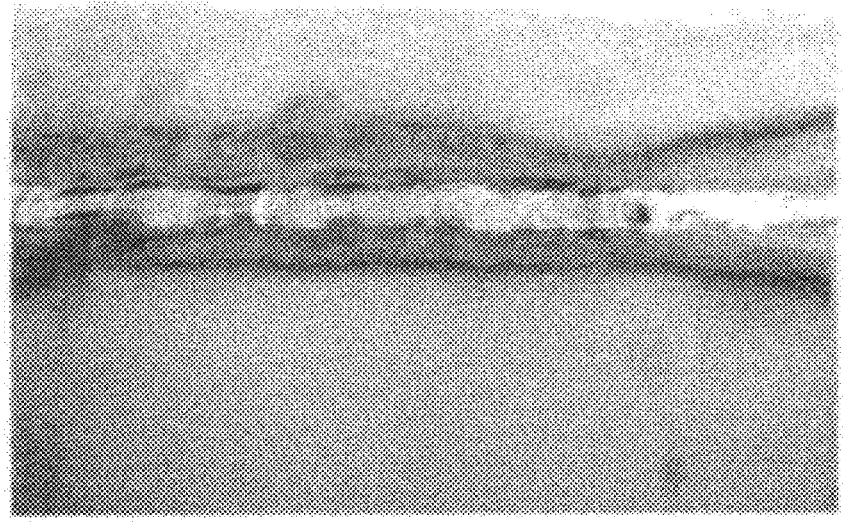
FIG. 1 is a photograph capturing a surface state after a CASS test for at test strip (untreated).

A surface material of a molding surface of a mold according to the present invention and a method for surface treatment for a molding surface of a mold to obtain the surface material are described below.

Treatment Subject: Molding Surface of Mold

The method for surface treatment of the present invention is a method of treatment having at least a molding surface of a mold as the treatment subject, and so the method for surface treatment of the present invention may be executed on just the molding surface, or may be executed on the entire mold including the molding surface thereof.

There is no particular limitation to the application of the mold subjected to treatment, and as long as the mold is employed in an application in which the molding surface reaches 50° C. or hotter during molding, the subjected mold may be a mold employed in various applications, such as for molding a food product, for molding a thermoplastic resin or a thermoset resin, or for molding a rubber. However, particularly preferable application is made to a mold for molding resins in which the molding surface reaches a temperature in the vicinity of from 100° C. to 400° C. during molding due to contact with molten resin or the like, or due to heating of the mold itself.

The substance of the mold subjected to treatment is not particularly limited as long as it contains a metal susceptible to corrosion. For example, molds of various steels generally employed for molds, such as stainless steels (SUS materials), carbon tool steels (SK materials), or alloy tool steels (SKS, SKD, SKT materials), may each be subjected to the treatment of the present invention. Moreover, molds of various substances may be subjected to treatment, such as molds made from other steel materials such as high speed tool steels (SKH materials), sintered metals such as cemented carbides, Cu—Be alloys, and molds made from other non-ferrous metal alloys.

Moreover, the mold is not necessary formed entirely of a metal material, and may be a mold that includes other components, such as ceramics for example.

Surface Treatment

The surface treatment of the present invention as described below is performed on at least a surface of a molding surface of one of the molds described above.

Preliminary Treatment Process

The present process (preliminary treatment process) is a process performed as required, and as such is a process that is not necessarily always performed depending on the application etc. for the mold, and is not an essential process of the present invention.

In the present process, a carbide powder is dry-ejected against a surface of a mold so as to prepare the surface by removing an electrical discharge hardened layer and softened layer arising on the surface of the mold due to electrical discharge processing or cutting processing during mold fabrication, or by removing directional processing marks (cutting marks, polishing marks, tool marks and the like) generated during machining, grinding, and polishing processes. In addition thereto, carbon element present within the carbide powder is caused to diffuse and penetrate into the surface of the mold, so as to perform carburizing at normal temperatures.

Examples of carbide powders that may be employed include the powders of carbide or carbon containing substances such as $B_4C$, SiC (SiC($\alpha$)), TiC, VC, graphite, diamond, and the like. SiC is preferably employed therefor, and SiC(α) is more preferably employed therefor.

When employed either for the objective of removing an electrical discharge hardened layer or softened layer, or removing directional processing marks, so that the carbide powder employed exhibits a high cutting force, preferably an angular powder is employed therefor that has been obtained for example by crushing a sintered carbide based ceramic and then sieving. The shape of the carbide powder is not particularly limited in cases lacking such a cutting objective, and a carbide powder with a spherical shape or one with various other shapes may be employed.

In order to obtain an ejection velocity required to achieve diffusion and penetration of carbon element, the size of the powder employed has a size of 220 grit (JIS R6001-1973) (from 44 μm to 105 μm) or finer, and preferably the powder employed has a size of so-called "fine particles" of 240 grit (JIS R6001-1973) (average of average diameter from 73.5 μm to 87.5 μm) or finer.

Various known blasting apparatuses capable of dry-ejecting a powder may be employed as the method for ejecting such a carbide powder onto an article to be treated. An air blasting apparatus is preferably employed therefor due to the comparative ease with which the ejection velocity and the ejection pressure can be adjusted.

A direct pressure blasting apparatus, suction gravity blasting apparatus, or various other types of blasting apparatus may be employed as such an air blasting apparatus. Any of these types of blasting apparatus may be employed, and the type thereof is not particularly limited as long as it has the performance capable of dry-ejecting at an ejection pressure of 0.2 MPa or above.

When a carbide powder as described above is dry-ejected at high speed using such a blasting apparatus against a surface of a mold at portions of the surface of the mold that will contact with the molding material, electrical discharge hardened layers and softened layers, directional processing marks, and the like arising during mold fabrication from electrical discharge processing and cutting processing are removed so as to prepare a non-directional mold surface.

Moreover, the impact of the carbide powder against the surface of the mold causes localized temperature rises on the surface of the mold at portions impacted by the carbide powder. The carbide powder is also heated and undergoes thermal decomposition. As the carbon element present within the carbide of the carbide powder diffuses and penetrates into the surface of the mold, the carbon content of these portions increases, enabling the hardness of the surface of the mold after performing the preliminary treatment process to be greatly increased.

In the preliminary treatment of the present invention, the carbide powder undergoes decomposition through thermal decomposition due to the temperature of the carbide powder rising when the carbide powder is caused to impact an article to be treated by the blast processing. The carburizing treatment is accordingly performed by thus generated carbon element present within the carbide powder accordingly diffusing and penetrating into the article to be treated.

According to the preliminary treatment of this method, the diffusion and penetration of carbon element into the mold is most significant at the greatest proximity to the surface, with this also resulting in a great increase the carbon content. The carbon content increases due to diffusion toward the inside of the article to be treated. This results in the generation of a tilting structure in which the carbon content gradually decreases with depth from the surface of the article to be treated, with the carbon content decreased to that of an untreated state by a certain depth.

The carbide powder and the article to be treated undergo a partial rise in temperature when the carbide powder impacts the article to be treated. However, the rise in temperature is only localized and instantaneous. Distortion, phase transformation, or the like in the article to be treated, such as that caused by heat treatment in an ordinary carburizing treatment performed by heating the entire mold in a carburizing furnace, is accordingly not liable to occur. Moreover, higher adhesion strength is achieved due to the generation of fine carbides, and an irregular carburized layer is not generated.

Instantaneous Heat Treatment Process

The present process (instantaneous heat treatment process) is performed on at least a molding surface of a mold subject to treatment (a molding surface of a mold after the preliminary treatment process in cases in which the preliminary treatment process described above has been performed). The present process is performed to achieve a surface profile that improves the demoldability by dry-ejecting a spherical powder against the surface of the mold so as to form innumerable fine depressions having a circular arc shape on the surface of the mold, and so as to further increase the surface hardness by micronization of structure in the vicinity of the surface of the molding surface.

There are no particular limitations to the substance of the spherical powder employed therefor, as long as the spherical powder has a hardness equal to or more than the hardness of the mold to be treated. For example, as well as spherical powders made from various metals, a spherical powder made from a ceramic may be employed, and a spherical powder made from a similar substance to the powders of carbon or carbon containing substances described above may also be employed therefor.

The spherical powder employed is spherical to an extent that enables innumerable fine indentations having a circular arc shape as described above to be formed on the surface of the mold.

Note that "spherical shaped" in the present invention need not refer strictly to a "sphere", and also encompasses non-angular shapes close to that of a sphere.

Such spherical powders can be obtained by atomizing methods when the substance of the powder is a metal, and can be obtained by crushing and then melting when the substance of the powder is a ceramic. In order to achieve the ejection velocity needed to plastically deform the surface of the mold by impact to form semi-circular indentations (dimples), the particle diameter of the powder employed therefor has a size of 220 grit (JIS R6001-1973) (from 44 μm to 105 μm) or finer, and preferably "fine particles" having a size of 240 grit (JIS R6001-1973) (average of average diameter from 73.5 μm to 87.5 μm) or finer are employed therefor.

Moreover, various known blasting apparatuses with dry-ejection capabilities, similar to those explained with respect to the ejection method for carbide powder when explaining the preliminary treatment process, may be employed as the method for ejecting the spherical powder onto the surface of the mold in such a manner The type and the like of the blasting apparatus is not particularly limited, as long as it has the performance capable of ejecting at an ejection pressure of at least 0.2 MPa.

The spherical powder such as described above is ejected against the surface for molding of the mold, and the impact of the spherical powder results in plastic deformation occurring on the surface the mold at the portion impacted by the spherical powder.

As a result, even in cases in which the preliminary treatment process has been performed by employing the angular carbide powder, and even in cases in which indentations and protrusions having acute apexes were formed on the surface of the mold in the cutting achieved by the impact of such a carbide powder, the surface roughness is improved by collapsing the acute apexes, and by randomly forming innumerable smooth depressions (dimples) with circular arc shapes on the entire surface of the mold.

Moreover, due to forming the dimples, a surface with improved demoldability is formed due to the incorporation of air and release agent into the dimples during molding reducing the contact area between the molding material and the molding surface.

Moreover, due to the heat generated when impacted by the spherical powder, the impacted portions experience instantaneous local heating and cooling. Accompanying the instantaneous heat treatment, fine crystals are also formed at the surface of the mold and the surface of the mold undergoes work hardening due to plastic deformation when the circular arc shape depressions are formed. The surface hardness of the mold is thereby further increased from that of the state after the preliminary treatment process. Moreover, due to a compressive residual stress being imparted by the plastic deformation of the surface, this is also thought at the same time to contribute to an increase in the fatigue strength and the like of the mold, in an effect obtained by so-called "shot peening".

Titanium Powder Ejection

A powder of titanium or titanium alloy (hereafter also referred to collectively as a "titanium powder") is also ejected against at least the molding surface after being subjected to the instantaneous heat treatment as described above. A titanium oxide coating film is thereby formed on the surface for molding of the mold.

Such a titanium powder is not particularly limited in shape as long as the titanium powder has a size of 100 grit (JIS R6001-1973) (from 74 μm to 210 μm) or finer, and the titanium powder employed may be spherical, angular, or various other shapes.

Moreover, a powder of a precious metal (such as Au, Ag, Pt, Pd, or Ru) having an effect of promoting the catalytic function of the titanium oxide may be mixed in with the titanium powder at a range of from about 0.1% to about 10% mass ratio, and ejected therewith.

Note that in the following description, the term titanium powder is employed as a collective term that encompasses titanium powders incorporating a precious metal, unless explanation particularly differentiates between a precious metal powder and a titanium powder.

In cases in which a titanium powder mixed with a precious metal powder is ejected, the particle diameters of both powders are not necessarily always the same diameter, and a titanium powder and a precious metal powder having different particle diameters may be employed.

In particular, the specific weight of precious metal powders is greater than that of titanium powders, and the particle diameter of the precious metal powder may be made smaller than that of the titanium powder so as to bring the masses of each particle of the two powders closer together, and to adjust such that the ejection velocities of both powders are substantially the same as each other.

Moreover, various known blasting apparatuses with dry-ejection capabilities, similar to those explained with respect to the ejection method for carbide powder or spherical shot when explaining the preliminary treatment process or the instantaneous heat treatment process, may be employed as the method for ejecting the titanium powder described above onto the surface of the mold. The type and the like of the blasting apparatus is not particularly limited, as long as it has the performance capable of ejecting at an ejection pressure of at least 0.2 MPa.

Ejecting the titanium powder as described above to cause the titanium powder to impact against the molding surface including the surface finely crystalized by the instantaneous heat treatment process results in the velocity of the titanium powder changing between before and after impact, and in energy of an amount equivalent to the deceleration in velocity becoming thermal energy that locally heats the impacted portions.

The titanium powder configuring the ejection powder is heated at the surface of the substrate by this thermal energy, and the titanium is activated and adsorbed to the substrate surface and diffuses and penetrates therein. When this occurs, the surface of the titanium reacts with oxygen present in compressed gas or oxygen present in the atmosphere, and is oxidized thereby so as to form a titanium oxide ($TiO_2$) coating film corresponding to the blend amounts in the ejection powder.

The film thickness of the titanium oxide coating film is about 0.5 μm, and is activated and adsorbed to the micronized surface structure formed on the molding surface by the instantaneous heat treatment. The titanium (titanium and precious metal in cases containing a precious metal powder) diffuses and penetrates inward from the substrate surface to a depth of about 5 μm.

Note that the titanium oxide coating film formed in this manner is oxidized by reaction with oxygen in compressed gas or the atmosphere due to heat generated during impact. This means that a tilting structure is generated in which there is a lot of bonding with oxygen in the vicinity of the surface where the temperature is highest, and the amount of bonding with oxygen gradually decreases on progression further inward from the surface.

EXAMPLES

The following Test Examples 1 to 4 illustrate examples in which the method for surface treatment of the present invention is applied to various molds, and the Test Example 5 illustrates a result when an evaluation test for corrosion resistance is performed on a test strip that has had the surface treatment of the present invention performed thereon.

Test Example 1: Pudding Mold (1) Treatment Conditions

A mold (Example 1) was produced by performing instantaneous heat treatment and titanium powder ejection under the conditions listed in Table 1 below to all faces, including a molding surface of a mold made from stainless steel (SUS 304) employed for molding puddings (a food product). The instantaneous heat treatment alone was performed to produce another mold (Comparative Example 1).

TABLE 1

Pudding Mold (SUS 304) Treatment Conditions

| Puding Mold | SUS 304 (380 HV) (φ50 mm × height 30 mm × thickness 1 mm) |
|---|---|
| Product to be Molded | Pudding (food product) |

|  | Instantaneous Heat Treatment | Titanium Powder Ejection |
|---|---|---|
| Blasting Apparatus | Gravity Type (SGF-4A: made by Fuji Manufacturing Co. Ltd) | |
| Ejection Substance Material | alumina-silica beads (hard beads FHB) | pure titanium (TIROP-150: made by Sumitomo Sitix Corporation) |
| Grain Size | 400 grit (from 38 μm to 53 μm diameter) | 100 grit or finer (from 45 μm to 150 μm diameter) |
| Ejection Pressure | 0.4 MPa | 0.5 MPa |
| Nozzle Diameter | φ 9 mm long | φ 9 mm long |
| Ejection Distance | 200 mm | 150 mm |
| Ejection Time | All faces: 30 seconds × 6 directions | All faces: 30 seconds × 6 directions |

(2) Test Method and Test Results

Puddings were consecutively manufactured while respectively employing the mold of Example 1 (instantaneous heat treatment+titanium powder ejection) and the mold of Comparative Example 1 (instantaneous heat treatment alone).

A so-called "baked pudding" was manufactured as the pudding by putting a mold containing a pudding liquid into an oven and heating.

After the pudding liquid filling the mold had been caused to solidify in the mold by the heat from the oven so as to mold the pudding, a subsequent operation was performed to remove the finished pudding from the mold. The "lifespan" was evaluated as the point when the mold was replaced accompanying a deterioration in demoldability, and dirt on the molding surface and demoldability were evaluated. The results thereof are listed in Table 2.

Note that the temperature (maximum value) at the molding surface during pudding manufacture (during molding) rises to 180° C., this being the temperature of the oven.

TABLE 2

Pudding Mold Test Results

|  | Surface Roughness (Ra) | Lifespan | Dirt/Demoldability |
|---|---|---|---|
| Comparative Example 1 | 0.3 μm | 10,000 hours | Became gradually more dirty and demoldability gradually deteriorated |
| Example 1 | 0.2 μm | 20,000 hours | Dirt did not adhere and demoldability was also good |

(3) Interpretation etc.

An untreated pudding mold (polished by buffing after press molding) had poor demoldability and needed to be replaced at 5,000 hours use. In comparison to the untreated mold, it was confirmed that not only the mold of Example 1, but also of Comparative Example 1, achieved a greatly extended lifespan, not being susceptible to dirt adhering and exhibiting good demoldability.

Moreover, whereas the untreated mold had a hardness of 380 HV and a residual stress of −190 MPa, the mold of the Comparative Example 1 subjected to instantaneous heat treatment as described above exhibited an improvement in surface hardness to 580 HV and an improvement in residual stress to −1080 MPa. A great reduction achieved in pitting corrosion generation was confirmed by a test according to the method of ferric chloride corrosion tests for stainless steels (JIS G0578:2000).

However, in the mold of Comparative Example 1 subjected to instantaneous heat treatment alone, there was noticeable adherence of dirt thereto and demoldability deteriorated after 10,000 hours of use, such that replacement was required.

In contrast thereto, with the mold of Example 1 subjected to both the instantaneous heat treatment and titanium powder ejection, neither the adherence of dirt nor a reduction in demoldability was seen even after exceeding 10,000 hours of use, enabling the lifespan to be extended to 20,000 hours of use.

The above results mean that one could say that the above advantageous effects are obtained in the mold of Example 1 by forming the titanium oxide coating film on the surface by titanium powder ejection. The titanium oxide coating film in the present invention at the surface material for a molding surface of a mold and formed by the treatment method thereof, is accordingly thought to be the entity that decomposed dirt in a state filled with the pudding liquid, and therefor decomposed dirt even in a state in which no light was being irradiated thereon. The titanium oxide coating film is also thought to be the entity that exhibited a photocatalyst-like function of preventing dirt from adhering due to hydrophilic properties being exhibited.

Although the reason that titanium oxide exhibited a photocatalyst-like function even in an environment not irradiated with light in this manner is not completely clear, industrially manufactured titanium oxide loses oxygen when heated to a high temperature, and changes from a white color to a black color. The material that has turned such a black color exhibits the properties of a semiconductor. Namely, semiconductor-like properties are exhibited when in a state in which there is a deficit of oxygen bonding.

The titanium oxide coating film formed on the surface of a mold in the present invention, as stated above, has a tilting structure in which the amount of bonding to oxygen is greatest in the vicinity of the surface of the mold, and the amount of bonding to oxygen gradually decreases on progression inward from the surface. The titanium oxide present inside accordingly has a deficit of bonding to oxygen, and this is thought to be the reason why semiconductor-like properties are exhibited thereby.

Thus by being employed under heating, charge migration is thought to occur due to thermal excitation, so as to have a catalyst-like (referred to as a "semiconductor catalyst-like" in the specification of the present invention) function triggering a charge-migration type of oxidation-reduction effect.

Generally a semiconductor catalyst needs to be a catalyst having a special structure, such as being doped with an electron donor element or with an electron acceptor element. Obtaining the advantageous effect of exhibiting a catalytic action with heat by using the titanium oxide coating film obtained by the comparatively simple method of titanium powder ejection is an advantageous effect that greatly exceeds expectations. Note that a catalyst-like action is exhibited even in an environment not irradiated with light as described above in a pudding mold with the surface material for a molding surface of a mold or treated with the treatment method thereof in the present invention, and a catalyst-like function is also exhibited when employed under heating at 50° C., as illustrated by "Test Example 5" described below. Similar advantageous effects, such as preventing dirt from adhering, improving demoldability, and extending lifespan, are accordingly thought to be obtained even in cases in which, instead of manufacturing a baked pudding as described above, a mold that has a surface treated with the method of the present invention is employed to manufacture gelatin puddings by taking a pudding liquid with added gelatin at about 50° C. to 60° C. and cooling and solidifying the pudding liquid inside the mold.

Test Example 2

TPU Molding Mold (1) Treatment Conditions

A molding surface of a mold made from prehardened steel for use in molding a thermoplastic polyurethane elastomer (TPU) is subjected to preliminary treatment, instantaneous heat treatment, and titanium powder ejection under conditions as listed in Table 3 below to produce a mold (Example 2). A mold (Comparative Example 2) was also produced by performing only the preliminary treatment and the instantaneous heat treatment thereon.

TABLE 3

| Treatment Conditions for Thermoplastic Polyurethane Elastomer Molding Mold | | | |
|---|---|---|---|
| Mold | Prehardened Steel (NAK 55 made by Daido Steel Co. Ltd: 400 HV) (500 mm × 500 mm × 20 mm) | | |
| Product to be Molded | Thermoplastic Polyurethane Elastomer | | |

| | Preliminary Treatment | Instantaneous Heat Treatment | Titanium Powder Ejection |
|---|---|---|---|
| Blasting Apparatus | gravity type (SGF-4A: made by Fuji Manufacturing Co. Ltd) | | |
| Ejection Substance Material | SiC | HSS | pure titanium (TIROP-150 made by Sumitomo Sitix Corporation) |
| Grain Size | 220 grit (from 44 μm to 105 μm diameter) | 300 grit (from 37 μm to 74 μm diameter) | 100 grit or finer (from 45 μm to 150 μm diameter) |
| Ejection Pressure | 0.3 MPa | 0.4 MPa | 0.5 MPa |
| Nozzle Diameter | φ 9 mm | φ 9 mm long | φ 9 mm long |
| Ejection Distance | 100 mm to 150 mm | 100 mm to 150 mm | 100 mm to 150 mm |
| Ejection Time | About 5 minutes | About 5 minutes | About 10 minutes |

(2) Test Method and Test Results

The mold of Example 2 (preliminary treatment+instantaneous heat treatment+titanium powder ejection) and the mold of Comparative Example 2 (preliminary treatment and instantaneous heat treatment alone) were each employed for molding a thermoplastic polyurethane elastomer.

When molding, successive operations were performed of filling a mold that had been heated to 50° C. with a thermoplastic polyurethane elastomer that had been heated to 220° C., molding, and taking the resin out from the mold after molding. The time when the mold was replaced due to an accompanying deterioration in demoldability was evaluated as the "lifespan" thereof, and dirt on the molding surface and demoldability were also evaluated. The results thereof are listed in Table 4.

TABLE 4

| Resin Mold Test Results | | | |
|---|---|---|---|
| | Surface Roughness (Ra) | Lifespan | Dirt/Demoldability |
| Comparative Example 2 | 0.3 μm | 400,000 shots | Little dirt adhering Slight problems of demolding |
| Example 2 | 0.3 μm | 700,000 shots | No dirt adhering No problems of demolding |

(3) Interpretation etc.

In the mold of Comparative Example 2 subjected to the preliminary treatment and the instantaneous heat treatment, there was little dirt adhering and slight defective molding. However, in the mold of Example 2 that had been further subjected to the titanium powder ejection in addition to the preliminary treatment and the instantaneous heat treatment, there was no dirt adhering nor problems demolding at all.

As a result, the lifespan of the mold of Example 2 was dramatically increased compared to the mold of Comparative Example 2.

The above results mean that one could say that the above advantageous effects are obtained in the mold of Example 2 by the titanium oxide coating film formed on the surface by titanium powder ejection. It is thought that the titanium oxide coating film in the present invention of the surface material for a mold and formed by the treatment method thereof was accordingly the entity that decomposed dirt on the molding surface employed a state in which no light was being irradiated thereon, and the entity that exhibited a photocatalyst-like function or semiconductor catalyst-like function of preventing dirt from adhering due to hydrophilic properties being exhibited.

Test Example 3

Glass Fiber Reinforced PPS Molding Mold (1) Treatment Conditions

A molding surface of a mold manufactured from prehardened steel for use in molding polyphenylene sulfide (PPS) containing glass fibers at a 40% mass ratio was subjected to preliminary treatment, instantaneous heat treatment, and titanium powder ejection under conditions as listed in Table 5 below to produce a mold (Example 3). A mold (Comparative Example 3) was also produced by performing the preliminary treatment and the instantaneous heat treatment alone.

TABLE 5

Treatment Conditions for Glass Fiber Reinforced PPS Molding Mold

| | | | |
|---|---|---|---|
| Mold | Prehardened Steel (STAVAX made by Bohler Uddeholm Co., Ltd: 560 HV) (250 mm × 250 mm × 50 mm) | | |
| Product to be Molded | PPS (containing 40% glass fiber) | | |
| | Preliminary Treatment | Instantaneous Heat Treatment | Titanium Powder Ejection |
| Blasting Apparatus | Fine powder type (SGF-4A: made by Fuji Manufacturing Co. Ltd) | | Direct pressure type (FD-4: made by Fuji Manufacturing Co. Ltd) |
| Ejection Substance Material | SiC | HSS | pure titanium (TIROP-150 made by Sumitomo Sitix Corporation) |
| Grain Size | 400 grit (average of average diameter of from 37 μm to 44 μm) | 400 grit (diameter from 30 μm to 53 μm diameter) | 100 grit or finer (from 45 μm to 150 μm diameter) |
| Ejection Pressure | 0.3 MPa | 0.5 MPa | 0.4 MPa |
| Nozzle Diameter | φ 9 mm | φ 9 mm long | φ 5 mm long |
| Ejection Distance | 100 mm to 150 mm | 100 mm to 150 mm | 150 mm to 200 mm |
| Ejection Time | About 4 minutes | About 4 minutes | About 6 minutes |

(2) Test Method and Test Results

The mold of Example 3 (preliminary treatment+instantaneous heat treatment+titanium powder ejection) and the mold of Comparative Example 3 (preliminary treatment and instantaneous heat treatment alone) were each employed for molding PPS containing glass fibers at 40% mass ratio.

When molding, successive operations were performed of filling a mold that had been heated to 150° C. with PPS heated to 300° C., molding, and taking the resin out from the mold after molding. The time when the mold was replaced due to an accompanying deterioration in demoldability was evaluated as the "lifespan" thereof, and dirt on the molding surface and demoldability were also evaluated. The results thereof are listed in Table 6.

TABLE 6

Test Results for PPS Molding Mold

| | Surface Roughness (Ra) | Lifespan | Dirt/Demoldability |
|---|---|---|---|
| Comparative Example 3 | 0.3 μm | 1,500,000 shots | Corrosion occurred and dirt adhered |
| Example 3 | 0.2 μm | 3,000,000 shots | No corrosion occurred Good demoldability |

(3) Interpretation etc.

In the mold employed for molding PPS resin reinforced with glass fiber, the molding surface is readily scratched through the high-hardness glass fibers contacting the molding surface. The molding surface is also readily corroded due to the PPS also generating a corrosive gas (acidic gas) containing sulfur and chlorine when the polymer of the PPS itself, or an oligomer component thereof, decomposes at high temperature.

In the mold of Comparative Example 3 subjected to the preliminary treatment and the instantaneous heat treatment, a dramatic reduction in the generation of corrosion also be achieved compared to an untreated mold, and a dramatic reduction in the adherence of dirt could also be achieved therein. However, in the mold of Example 3 further subjected to the titanium powder ejection in addition to the preliminary treatment and the instantaneous heat treatment, corrosion no longer occurred and the mold showed good demoldability, resulting in no dirt adhering nor any demolding problems. The lifespan of the mold of Example 3 was accordingly improved by a factor of two compared to the mold of Comparative Example 3.

The above results mean that one could say that the above advantageous effects can be obtained in the mold of Example 3 by forming the titanium oxide coating film on the surface by the titanium powder ejection. The surface material of a molding surface of a mold of the present invention and the titanium oxide coating film formed by the treatment method thereof is thought to exhibit a photocatalyst-like function of preventing the generation of corrosion on the molding surface not irradiated with light, decomposing dirt, and preventing dirt from adhering due to hydrophilic properties being exhibited.

Test Example 4

Mold for Rubber (1) Treatment Conditions

A mold (Example 4) was produced by subjecting a molding surface of a prehardened steel mold employed for molding rubber to preliminary treatment, instantaneous heat treatment, and titanium powder ejection under conditions as listed in Table 7 below, and a mold (Comparative Example 4) was also produced by performing the preliminary treatment and the instantaneous heat treatment alone.

TABLE 7

| Rubber Mold Treatment Conditions | | | |
|---|---|---|---|
| Mold | Prehardened Steel (NAK 55 made by Daido Steel Co. Ltd: 400 HV) (450 mm × 450 mm × 20 mm) | | |
| Product to be Molded | Rubber | | |
| | Preliminary Treatment | Instantaneous Heat Treatment | Titanium Powder Ejection |
| Blasting Apparatus | Gravity type (SGF-4A: made by Fuji Manufacturing Co. Ltd) | | Direct Pressure type (FD-4: made by Fuji Manufacturing Co. Ltd) |
| Ejection Substance Material | SiC | HSS | pure titanium (TIROP-150 made by Sumitomo Sitix Corporation) |
| Grain Size | 220 grit (from 44 μm to 105 μm diameter) | 300 grit (from 37 μm to 74 μm diameter) | 100 grit or finer (from 45 μm to 150 μm diameter) |
| Ejection Pressure | 0.3 MPa | 0.5 MPa | 0.4 MPa |
| Nozzle Diameter | φ 9 mm | φ 9 mm long | φ 5 mm long |
| Ejection Distance | 100 mm to 150 mm | 100 mm to 150 mm | 150 mm to 200 mm |
| Ejection Time | About 5 minutes | About 5 minutes | About 8 minutes |

(2) Test Method and Test Results

The mold of Example 4 (preliminary treatment+instantaneous heat treatment+titanium powder ejection) and the mold of Comparative Example 4 (preliminary treatment and instantaneous heat treatment alone) were each employed for molding a rubber.

When molding the rubber, repeated operations were performed of filling a mold that had been heated to 150° C. with a vulcanized rubber, then closing the mold and pressing the rubber to harden (direct compression molding) and taking the molded article out from the mold after hardening. The time when the mold was replaced due to an accompanying deterioration in demoldability was evaluated as the "lifespan" thereof, and dirt on the molding surface and demoldability were also evaluated. The results thereof are listed in Table 8.

TABLE 8

| Mold for Rubber Test Results | | | |
|---|---|---|---|
| | Surface Roughness (Ra) | Lifespan | Dirt/Demoldability |
| Comparative Example 4 | 0.4 μm | 750,000 shots | Some dirt adhering |
| Example 4 | 0.3 μm | 1,000,000 shots | No dirt adhering No problems demolding |

In the mold of Comparative Example 4 subjected to the preliminary treatment and the instantaneous heat treatment alone there was also a great reduction in dirt adhering and demolding problems compared to an untreated mold. However, a further reduction dirt adhering could be achieved in the mold of Example 4 that had been further subjected to the titanium powder ejection in addition to the preliminary treatment and the instantaneous heat treatment.

In a mold for rubber, great effort and expense is incurred in operations to clean the mold after usage. However, in the mold of the present invention, a significant reduction could be achieved in the effort incurred for cleaning operations after use, dirt did not adhere even after being used for 1,000,000 shots, and the lifespan of the mold could be greatly extended.

The above results mean that, due to the mold of Example 4 exhibiting excellent antifouling properties compared to the mold of Comparative Example 4, one could say that the above advantageous effects were obtained in the mold of Example 4 due to forming the titanium oxide coating film on the surface by the titanium powder ejection. The titanium oxide coating film formed in the present invention on the surface material for a molding surface of a mold is thought to exhibit a photocatalyst-like or semiconductor catalyst-like function, which is to decompose dirt even on the molding surface for rubber employed in a state not irradiated with light and to prevent dirt from adhering due to hydrophilic properties being exhibited.

Test Example 5

Corrosion Resistance Test (1) Test Objective

The test objective was to confirm that a mold according to the present invention, and a steel surface that had been subjected to the surface treatment with the treatment method thereof, would exhibit a corrosion inhibiting effect in an environment not irradiated with light.

(2) Test Method

SUS 304 was welded (TIG welded) and imparted with a tensile residual stress to produce a test strip susceptible to stress corrosion cracking. A CASS test according to JIS H 8502:1999 "7.3 CASS Test Method" was then performed on a welded test strip that was otherwise untreated, and on a welded test strip of the mold and molding method for surface treatment according to the present invention (instantaneous heat treatment+titanium powder ejection).

The CASS test performed here differs from a salt spray test performed by simply spraying salt water, and is a corrosion resistance test performed by spraying a brine adjusted to an acidity of from pH 3.0 to pH 3.2 by the addition of copper II chloride and acetic acid. This means that the CASS test is a test of corrosion resistance performed in an extremely hash corrosion environment.

Note that the test conditions of the CASS test are as listed in the following Table 9.

TABLE 9

| CASS Test Conditions | | |
|---|---|---|
| Item | When Adjusted | During Test |
| Sodium chloride concentration in g/L | 50 ± 5 | 50 ± 5 |
| Copper II chloride (CuCl$_2$•H$_2$O) concentration in g/L | 0.26 ± 0.02 | — |
| pH | 3.0 | 3.0 to 3.2 |
| Spray rate in ml/80 cm$^2$/h | — | 1.5 ± 0.5 |
| Temperature inside test chamber in ° C. | — | 50 ± 2 |
| Temperature of brine tank in ° C. | — | 50 ± 2 |
| Temperature of saturated air vessel in ° C. | — | 63 ± 2 |
| Compressed air pressure in kPa | — | from 70 to 167 |

(3) Test Result and Interpretation

Figure 2:
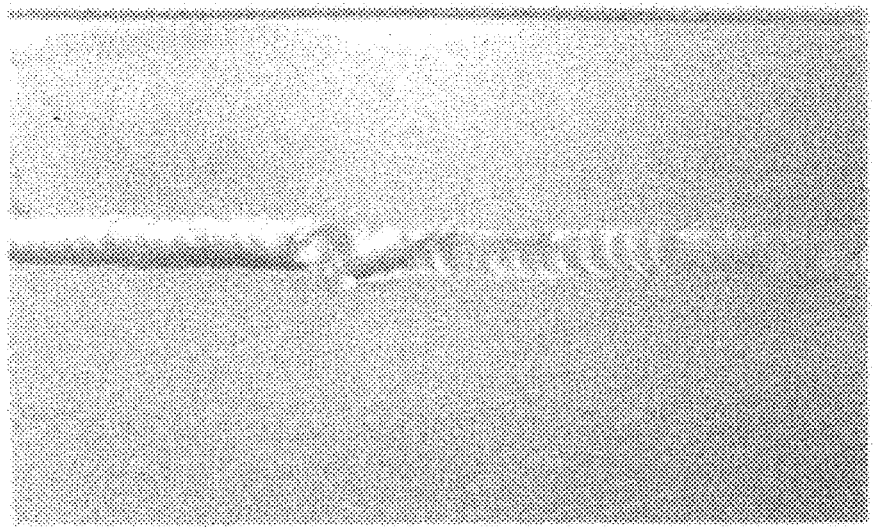
FIG. 2 is a photograph capturing a surface state after a CASS test for at test strip (Example).

The state of test strips after the CASS test are illustrated in FIG. 1 (untreated) and FIG. 2 (Example).

As illustrated in FIG. 1, the generation of rust was observed on the surface of the untreated test strip.

In contrast thereto, on the test strip that had been subjected to surface treatment for a mold according to the present invention and method thereof, no rust generation was observed and the clean state present prior to the CASS test was maintained, as illustrated in FIG. 2, confirming that the test strip of the mold according to the present invention enabled extremely high corrosion resistance to be obtained.

In shot peening, tensile residual stress that has been generated in a test strip by welding is released, and a compressive residual stress is imparted thereto. This is accordingly known to have an advantageous effect of inhibiting stress corrosion cracking, however is not known to directly inhibit corrosion (rust) from occurring.

In the test strip of the surface material of the molding surface of the present invention, against rust generation the titanium oxide coating film formed on the surface thereof by titanium powder ejection is accordingly thought to be the reason a photocatalyst-like or a semiconductor catalyst-like function (reduction function) is exhibited.

Note that a CASS test is a test performed using a lidded test chamber in order to maintain the environment inside the test chamber in a constant state, and light is accordingly not irradiated onto the test strip during testing.

However, the CASS test is performed by testing in a state in which the temperature inside the test chamber is 50° C.±2° C., and so the temperature of the test strip is also warmed to 50° C.±2° C. The titanium oxide coating film is thought to exhibit the photocatalyst-like or semiconductor catalyst-like function due to testing being performed in such a warmed state.

Note that the surface roughness Ra was 0.3 μm at a smooth portion in the vicinity of the weld on the test strip of the Comparative Example that had been subjected to instantaneous heat treatment by the ejection of 400 grit (diameter from 30 μm to 53 μm) shot made from HSS ejected at an ejection pressure of 0.5 MPa thereon, and the surface hardness was improved to 580 HV from an untreated state of 300 HV.

The surface roughness Ra was improved to 0.2 μm at a smooth portion in the vicinity of the weld on the test strip of the present invention Example that was a test strip subjected to instantaneous heat treatment under the above conditions, and then further subjected to ejection of titanium powder of particle diameter from 45 µm to 150 µm ejected at an ejection pressure of 0.4 MPa. The surface hardness after treatment was also maintained without change at 580 HV.

The hardness of titanium is about 300 HV, however the hardness of titanium oxide ($TiO_2$), an oxide of titanium, reaches a hardness of 1000 HV. Thus the surface hardness of the titanium powder used for ejection is accordingly a hardness of about 1000 HV and higher than the 580 HV surface hardness of the test strip after the instantaneous heat treatment from forming an oxide coating film.

Thus in the method for surface treatment of the present invention, the titanium powder ejection against the surface after instantaneous heat treatment is thought to smooth by pressing and collapsing protrusion tips of surface indentations and protrusions formed by the impact of shot during the instantaneous heat treatment, so that burnishing is performed.

Namely, not only are there depressions (dimples) formed by the impact of shot on the surface of the test strip after instantaneous heat treatment, but a state is achieved in which acute protrusions are also formed between one and another of the formed depressions.

In contrast thereto, by further performing the titanium powder ejection against the surface after instantaneous heat treatment, smoothing (burnishing) is achieved by pressing and collapsing the protrusions of the indentations and protrusions that had been formed on the surface. The surface achieved thereby, which lacks pointed protrusions and has been deformed into a smoothed profile with depressions alone, is thought to be why the numerical value of the surface roughness Ra is reduced.

Thus with the surface material of the molding surface according to the present invention, apex portions of pointed protrusions, which would resist removal when removing the molded article from the mold, are pressed and collapsed so as to smooth the surface material while leaving the depressions (dimples) that were generated by the instantaneous heat treatment, into which a release agent and air etc. can be introduced to reduce the contact area between the surface of the molded article and the surface of the mold. The surface material accordingly not only exhibits improved demoldability that accompanies the antifouling and anticorrosion due to the photocatalyst-like or semiconductor catalyst-like effect of the titanium oxide, but after processing the surface itself has an improved and superior structure with improved demoldability.

SUMMARY OF TEST RESULTS

The Test Examples 1 to 5 as described above had the titanium oxide coating film formed on the molding surface of the present invention (the surface of the test strip in the Test Example 5). In each case the results obtained indicated that, irrespective of the tests being performed in state in which light is not irradiated thereon, the titanium oxide coating film formed on the surface exhibited a photocatalyst-like function.

However, in each of the Test Examples 1 to 5 described above, the tests were performed in a state in which the molding surface (the surface of the test strip in Test Example 5) had been heated or warmed to a temperature of 50° C.±2° C. or hotter. Due to there being no other energy present to excite a photocatalyst function of the titanium oxide coating film, the logical postulation is that the advantageous effects described above of improved corrosion resistance and anti-fouling etc. were induced by the heat imparted to the portions formed with the titanium oxide coating film.

Thus in Test Examples 1 to 5, realization of a photocatalyst-like or semiconductor catalyst-like function was confirmed (see Test Example 5) in a state in which a sample has been warmed to at least 50° C. (±2° C.). Thus application of the surface treatment of the present invention to at least a molding surface of a mold having a molding surface that reaches 50° C. or hotter during molding, enables the following advantageous effects to be obtained at the same time: improved wear resistance accompanying raising the hardness of the molding surface; improved corrosion resistance; and improved demoldability.

The invention claimed is:

1. A method of using a mold subjected to surface treatment of a molding surface of the mold, the surface treatment of the molding surface of the mold comprising:
    ejecting spherical powder against at least the molding surface of the mold which is made from a metal or a substance including a metal, the spherical powder having a size from 30 µm to 105 µm and having a hardness equivalent to or harder than a surface hardness of the mold, the spherical powder ejection being at an ejection pressure of not less than 0.2 MPa so as to perform instantaneous heat treatment by impact of the spherical powder causing a local and instantaneous rise in temperature at impacted portions, so as to micronize a surface structure of the molding surface and form circular arc shaped depressions over an entire surface of the molding surface; and
    forming a titanium oxide coating film on the surface of the molding surface by ejecting a powder formed from titanium or titanium alloy having a size from 45 µm to 210 µm at an ejection pressure of not less than 0.2 MPa against the surface of the mold that had been subjected to the instantaneous heat treatment so as to form a titanium oxide coating film having a tilting structure in which an amount of bonding to oxygen is greatest in a vicinity of the surface of the molding surface, and the amount of bonding to oxygen gradually decreases on progression inward from the surface, and exhibiting a photocatalyst-lke function even in an environment not irradiated with light during molding on the surface of the molding surface, and
    when using the mold subjected to the surface treatment of the molding surface of the mold, the molding surface of the mold being heated or warmed to 50° C. to 400° C., and no light being irradiated to the molding surface of the mold.

2. The method for of using the mold subjected to the surface treatment of the molding surface of claim 1, wherein the mold is a mold employed for molding a food product, a thermoplastic resin, a thermoset resin, a natural rubber, or a synthetic rubber.

3. The method for of using the mold subjected to the surface treatment of the molding surface of claim 1 wherein the mold is a mold employed for molding a resin for which the molding surface reaches from 100° C. to 400° C. during molding through contact with molten resin or through heating the mold itself.

4. The method for of using the mold subjected to the surface treatment of the molding surface of claim 1, further comprising:
    performing a preliminary treatment process prior to performing the instantaneous heat treatment, the preliminary treatment process including ejecting a carbide powder having a size from 30 µm to 105 µm at an ejection pressure of not greater than 0.2 MPa against at least the molding surface of the mold so as to cause carbon element contained in the carbide powder to diffuse into the surface of the mold.

5. The method for of using the mold subjected to the surface treatment of the molding surface of claim 4, wherein the carbide powder ejected in the preliminary treatment process is a silicon carbide powder.

6. The method for of using the mold subjected to the surface treatment of the molding surface of claim 2 wherein the mold is a mold employed for molding the thermoplastic resin for which the molding surface reaches from 100° C. to 400° C. during molding through contact with molten the thermoplastic resin which is melted or through heating the mold itself.

7. The method of using the mold subjected to the surface treatment of the molding surface of claim 2, further comprising:

performing a preliminary treatment process prior to performing the instantaneous heat treatment, the preliminary treatment process including ejecting a carbide powder having a size from 30 μm to 105 μm at an ejection pressure of not greater than 0.2 MPa against at least the molding surface of the mold so as to cause carbon element contained in the carbide powder to diffuse into the surface of the mold.

* * * * *